United States Patent
Isomura et al.

(10) Patent No.: US 7,678,405 B2
(45) Date of Patent: Mar. 16, 2010

(54) OIL-IN-WATER TYPE EMULSION COMPRISING VEGETABLE STEROLS

(75) Inventors: Takashi Isomura, Kawasaki (JP); Junichi Tashiro, Tokyo (JP); Atsuhito Shima, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 1208 days.

(21) Appl. No.: 10/496,315

(22) PCT Filed: Nov. 29, 2002

(86) PCT No.: PCT/JP02/12493

§ 371 (c)(1),
(2), (4) Date: Nov. 16, 2004

(87) PCT Pub. No.: WO03/047359

PCT Pub. Date: Jun. 12, 2003

(65) Prior Publication Data

US 2005/0074536 A1    Apr. 7, 2005

(30) Foreign Application Priority Data

Dec. 7, 2001    (JP) .............................. 2001-374877

(51) Int. Cl.
*A23L 1/24*    (2006.01)
(52) U.S. Cl. .................. 426/605; 426/602; 426/613
(58) Field of Classification Search ................. 426/602, 426/605, 613
See application file for complete search history.

(56) References Cited

U.S. PATENT DOCUMENTS

| | | | | |
|---|---|---|---|---|
| 6,031,118 A | * | 2/2000 | van Amerongen et al. ... | 552/544 |
| 6,316,030 B1 | * | 11/2001 | Kropf et al. .................. | 424/489 |
| 6,352,737 B1 | * | 3/2002 | Dolhaine et al. ............. | 426/611 |
| 6,589,588 B1 | * | 7/2003 | Wester et al. ................ | 426/607 |
| 6,800,317 B2 | * | 10/2004 | Wester et al. ................ | 426/417 |
| 6,929,816 B2 | * | 8/2005 | Wester ........................ | 426/607 |

FOREIGN PATENT DOCUMENTS

| | | |
|---|---|---|
| EP | 898896 | 3/1999 |
| EP | 1 275 309 | 1/2003 |
| EP | 1 454 532 | 9/2004 |
| JP | 06-506909 | 8/1994 |
| JP | 11-127779 | 5/1999 |
| JP | 11-146757 | 6/1999 |
| JP | 11-506324 | 6/1999 |
| JP | 2000-102361 | 4/2000 |
| JP | 2002-171931 | 6/2002 |
| JP | 2004-2601 | 1/2004 |
| JP | 2004-533491 | 11/2004 |
| WO | WO 92/19640 | 11/1992 |
| WO | 98/19556 | 5/1998 |
| WO | 99/43218 | 9/1999 |
| WO | 00/73407 | 12/2000 |
| WO | WO 01/72136 | 10/2001 |

OTHER PUBLICATIONS

Anon. 2003. Code of Federal Regulations. 21 CFR 169.140 & 169.150, p. 545, 548, 549.*

* cited by examiner

*Primary Examiner*—Carolyn A Paden
(74) *Attorney, Agent, or Firm*—Oblon, Spivak, McClelland, Maier & Neustadt, L.L.P.

(57) ABSTRACT

The purpose of the present invention is to provide oil in water type emulsion supplemented with phytosterol, and having an excellent emulsion stability during storage. The present invention relates to oil in water type emulsion comprising ester-type phytosterol of 1.5~50%, and free-type phytosterol of 0.01~1.0% of oil phase of the emulsion.

21 Claims, No Drawings

OIL-IN-WATER TYPE EMULSION COMPRISING VEGETABLE STEROLS

TECHNICAL FIELD

The present invention relates to an oil-in-water (O/W) type emulsion supplemented with phytosterol. The "pytosterol" in this specification refer to a general concept that comprises both free- and ester-components of the phytosterol. The free component of the pytosterol will be referred to hereinafter as a "free-type phytosterol", and its ester component as an "ester-type phytosterol."

BACKGROUND ART

Vegetable oil widely contains a slight amount of phytosterol such as β-sitosterol, stigmasterol and campesterol in the form of the free-type phytosterol and the ester-type phytosterol.

For example, rape oil contains 0.3~0.7% of the ester-type phytosterol and 0.2~0.4% of the free-type phytosterol; corn oil contains 0.3~0.8% of the ester-type phytosterol and 0.1~0.4% of the free-type phytosterol; and soybean oil contains 0.1~0.5% of the ester-type phytosterol and 0.1~0.4% of the free-type phytosterol.

Recently, a cholesterol-lowering effect due to the phytosterol has been noticed, and water-in-oil (WIO) type emulsion such as fat spread is now commercially available.

However, among phytosterol produced as edibles, the free-type phytosterol is hardly soluble both in water and oil, and the ester-type phytosterol is hardly soluble in water. Some adjustment will be needed in the formulation of foods comprising them.

When compared with the W/O type emulsion such as fat spread, the O/W type emulsion has more problems that a drastic increase in particle size due to aggregation of oil drops and the phase-transition of emulsion will cause reduction in emulsion stability, making it liable to induce the destruction of emulsion during storage, especially under loads such as shaking during distribution or transportation.

Techniques such as those to reduce a ratio of oil phase or to add an emulsifier were tried in order to overcome the above destruction of the emulsion. However, the reduction of the ratio of oil phase would eliminate body taste, and an excess amount of the added emulsifier would deteriorate its taste.

The representative related techniques in the art will be listed as follows.

First, the Japanese Patent Application Publication Hei 11(1999)-506324 (the applicant: Unilever N.V.) discloses an invention relating to fat-based foods defined by their components and contents for the purpose of lowering cholesterol in serum. However, although it discloses butter-like spread, dressing, coffee creamer, and shortening as the examples of the fat-based foods, it does not refer to O/W emulsion that has a stability-related problem It describes that esterification would rather be a non-preferable embodiment (page 14, second paragraphs before Example 1).

Second, the Japanese Patent Application Publication Hei 11 (1999)-146757 (the applicant: Unilever N.V.) discloses an invention relating to a stable aqueous dispersion or suspension and its use for foods, enabling the use of fat/oil having a high melting point such as phytosterol. It also describes that the diameter of the particles of said fat/oil and the amount of an emulsifier should be limited in order to use said fat/oil, and that non-esterified sterol would be most advantageously applied (the paragraph 45).

Third, the Japanese Patent Application Publication Hei 11(1999)-127779 (the applicant: Unilever N.V.) discloses an invention relating to foods containing sterol-containing fat and having a cholesterol-lowering effect. The invention aims at resolving the problems involved in the esterification of the phytosterol that it will reduce the cholesterol-lowering effect in serum, and that it will also need a long time and a high cost for its processes.

Forth, the Japanese Patent Application Publication 2000-102361 (the applicant: McNeil PPC., Inc.) discloses an invention relating to a method for the production of salad dressing containing sterol ester, which is stable even under refrigeration (the paragraph 0001). The invention is characterized by comprising an emulsifier or hydro-colloid, and an inhibitor against crystallization of fat. With respect to the sterol ester, it does not describe or suggest a degree of esterification, but just discloses a supplying amount of P-sitosterol for the purpose of decreasing the amount of cholesterol.

The purpose of the present invention is to provide an O/W type emulsion supplemented with phytosterol, which has a high emulsion stability.

DISCLOSURE OF THE INVENTION

The present invention is related to an O/W type emulsion comprising ester-type phytosterol of 1.5~50%, and free-type phytosterol of 0.01~1.0% of oil phase in the emulsion.

Although a part of the phytosterol is removed in a deodorizing step and the like during purification processes of oil, general kinds of edible vegetable oil contain a slight amount of both the ester-type phytosterol and the free-type phytosterol. For example, as already mentioned above, rape oil contains 0.3~0.7% of the ester-type phytosterol and 0.2~0.4% of the free-type phytosterol; corn oil contains 0.3~0.8% of the ester-type phytosterol and 0.1~0.4% of the free-type phytosterol; and soybean oil contains 0.1~0.5% of the ester-type phytosterol and 0.1~0.4% of the free-type phytosterol. When the O/W type emulsion is prepared using such kinds of oil, the emulsion stability will be kept during storage including distribution or transportation.

However, at least a certain amount of the phytosterol has to in order to show the lowering effect of cholesterol in serum. The same effect is attributed to inhibition of cholesterol absorption by the free-type phytosterol. The ester-type phytosterol will show the same effect after being decomposed into its free component. However, when the ester-type phytosterol is purified from oil/fat in the prior arts, the amount of the free-type phytosterol will be simultaneously increased. It has been therefore difficult to prepare a stable O/W emulsion taking the properties of both the ester-type phytosterol and the free-type phytosterol into consideration.

The ester-type phytosterol may be generated by esterification or ester-exchange reaction of the free-type phytosterol with fatty acid-containing substances such as triglycerides, fatty acids and methyl ester of fatty acids. However, unreacted free-type phytosterol will still remain in such reaction. Accordingly, it is difficult to prepare the stable O/W emulsion taking the properties of both the ester-type phytosterol and the free-type phytosterol into consideration.

"%" means "% by weight" in the present specification unless otherwise specifically defined. Similarly, the numbers in the Examples of the present specification should be understood as expressed in units of % by weight as well.

There is no limitation with respect to the kinds of phytosterol, including any one known to those skilled in the art such as β-sitosterol, stigmasterol and campesterol. There is no limitation with respect to oil/fat to be mixed with the phytosterol as long as it is edible, being preferably rape oil, corn oil and soybean oil in respect of costs, taste and versatility.

The present O/W type emulsion comprises the ester-type phytosterol of 1.5~50%, preferably of 5~35% of the oil phase in the emulsion. A more amount of the ester-type phytosterol would not be preferable in view of costs and stability, and a less mount of the ester-type phytosterol could not show a sufficient cholesterol-lowering effect.

The present O/W type emulsion comprises the free-type phytosterol of 0.01~1.0%, preferably of 0.3~0.6% of the oil phase in the emulsion. A more amount of the free-type phytosterol would deteriorate the emulsion stability, and a less mount of the free-type phytosterol would not be preferable in view of production costs.

A ratio of the oil phase in the present O/W, type emulsion ranges preferably between 50 and 90%, more preferably between 60 and 80%. A higher ratio would be liable to cause phase transition. As a lower ratio would have tendency of improving the emulsion stability, the specific advantages of the present invention will be especially recognized when the ratio of the oil phase is 50% or more.

Furthermore, it is desired for the present invention to effect its advantages that esterification degree of the phytosterol in the oil phase of the present invention is preferably higher than 90, more preferably higher than 95. The esterification degree is a value that is obtained by the following equation:

Esterification Degree:

(Content of the ester-type phytosterol in the oil phase (mol))/(Total content of the ester-type phytosterol and the free-type phytosterol in the oil phase (mol))×100

Other emulsifiers than egg material, which contribute to the emulsion stability, may be used in the present invention in order to improve it. However, since the emulsion of the present invention is stable even without using any emulsifier, the advantages of the present invention will be more significantly observed in the O/W type emulsion without comprising any emulsifier in view of taste and costs. The emulsifier in the present invention includes xanthan gum, low cast bean gum, carrageen and a thickening gent such as agar, in addition to emulsifiers such as sucrose ester, fatty acid ester of polyglycerine and enzyme-treated egg.

The O/W type emulsion of the present invention may be prepared by any general method known in the art. It may be prepared, for example, by pre-mixing water phase and oil phase and emulsifying the mixture to a state having given properties by means of colloid mill, by reference to, for example, Chuhei IMAI, "Knowledge about Mayonnaise & Dressing", published by Saiwai Publishing Company, 1993, p. 107-134.

Phytosterol with a decreased ratio of its free-type in the O/W type emulsion of the present invention may be prepared by any general method known in the art. For example, the ratio of the free-type phytosterol may be optionally decreased by esterifying the free-type phytosterol by means of sodium methylate and the like, and controlling the conditions of a steam distillation to a strong level

BEST MODE FOR CARRYING OUT THE INVENTION

The present invention will be explained in more detail with reference to the following examples, which should not be construed as limiting a technical scope of the present invention.

In the following examples, the ratio of the free-type phytosterol was optionally decreased. Thus, the content of the free-type phytosterol in the phytosterol was adjusted to a determined value by esterifying the free-type phytosterol with fatty acids by means of sodium methylate and controlling the conditions of a steam distillation to a strong level.

The following examples were carried out with reference to Chuhei IMAI, "Knowledge about Mayonnaise & Dressing", published by Saiwai Publishing Company, 1993, p. 107-134.

The contents of total sterol, the ester-type phytosterol and the free-type phytosterol were determined as follows.

Determination Method of a Total Amount of Sterol in the O/W Type Emulsion

[Saponification]

O/W type emulsion (0.5 g) is weighed in an Erlenmeyer flask with frost (with a glass stopper), followed by the addition of ethanol solution (25 ml) of 2 mol/l of potassium hydroxide and pyrogallol (25 ml). A reflux condenser is attached to the flask, which is then heated on a water bath at 90° C. or more for one hour for saponification. The saponificated product is transferred into a separating funnel, mixed with water (150 ml) and ethyl ether (diethyl ether) (50 ml), stirred, and kept standing still to be separated into two phases. The lower phase is then taken, washed with water, and dried by means of an evaporator. The extract is dissolved in ethyl ether (3 ml), a part of which (1 ml) is reacted with TMSI-H (5 ml), and mixed with acetone (1 ml). The upper phase is subjected to GC analysis.

[GC Analysis Conditions]
Column: CP-Sil8CB (0.25 mm×30 m);
Injector Temp.: 280° C.;
Detector Temp.: FID 290° C.;
Oven program: 260° C. (50 min.), 10° C./min, 300° C. (5 min.);
Split ratio: 50:1;
Column Flowing rate: 1.4 ml/min.

Determination of the Free-type and Ester Type Phytosterol

[TLC Fractionation and GC Analysis]

O/W type emulsion (5 g) is weighed in a n Erlenmeyer flask, kept for separation, mixed with methanol (50 ml) and chloroform (100 ml), and then transferred into a separating funnel. After the solution is sufficiently stirred, it is mixed with 0.9% sodium chloride solution, stirred and allowed to stand still. Chloroform phase is then taken, filtered and dried to solid. An appropriate amount of a solution of the resulting solid in ethyl ether is applied on a HPTLC plate, developed with a solution of hexane 70%/ethyl ether 30%, dried and reacted with iodine to develop color. The spots of the free-type phytosterol and the ester-type phytosterol are picked up by scratching, respectively, extracted with a solution of chloroform 50%/methanol 50%, and dried to solid. The resulting solid is saponificated and subjected to GC analysis in the same manner as in the above "Determination Method of a Total Amount of Sterol in the O/W type emulsion." An amount of each type of the phytosterol is obtained by multiplying the total amount of sterol by each ratio.

[HPTLC Conditions]
HPTLC plate: 25HPTLC plate Silicagel160 (Merk Co.);
Developing agent: hexane 70%/ethyl ether 30%

EXAMPLE 1

Egg (8%), starch syrup (4%) and others (8.5%) including salt, seasoning, lemon juice, spice and water were manually stirred and mixed. After further being mixed with vinegar (7.5%), rape oil (57%) and phytosterol (15%) having three different ratios of the ester type and the free-type phytosterol, the resulting mixture was put into a hobart mixer, mixed to be emulsified in a homo genized state. It was further emulsified by means of a colloid mill emulsifier to give O/W type emulsion of the present invention 1, the present invention 2 and comparative example 1, respectively.

A polyethylene bag (inner size: 7×12 cm) was filled with each resulting O/W type emulsion (50 g) and subjected to a shaking test under the conditions of shaking width: 2 cm, shaking rate: 250 times/min, and test time: 30 min so as to observe occurrence of the separation of oil.

The composition of the O/W type emulsion and test results are shown in Table 1.

The figures in the columns of "Free-type phytosterol (in oil phase)" and "Ester-type phytosterol (in oil phase)" mean the content of each phytosterol contained in the oil phase such as edible vegetable oil or phytosterol. The symbols of "x", "○", and "⊚" in the column "Storage stability" mean "occurrence of the separation of oil", "occurrence of a slight separation of oil, which will not deteriorate the quality of products under usual storage conditions", and "no occurrence of the separation of oil" after the shaking test, respectively.

TABLE 1

|  | Comparative example 1 | Present invention 1 | Present invention 2 |
|---|---|---|---|
| Rape oil | 57 | 57 | 57 |
| Phytosterol | 15 | 15 | 15 |
| Egg | 8 | 8 | 8 |
| Vinegar | 7.5 | 7.5 | 7.5 |
| Starch syrup | 4 | 4 | 4 |
| Salt, Seasoning, Lemon Juice, Spice and Water | 8.5 | 8.5 | 8.5 |
| Total | 100 | 100 | 100 |
| Ester-type phytosterol (in oil phase) | 19.65 | 20.28 | 20.69 |
| Free-type phytosterol (in oil phase) | 1.46 | 0.83 | 0.42 |
| Esterification degree | 89.2 | 93.7 | 96.8 |
| Storage stability | X | ○ | ⊚ |

EXAMPLE 2

The O/W type emulsion was prepared by using the same apparatuses as in Example 1. Thus, Egg (9%), and others (10%) including starch syrup, salt, seasoning, lemon juice, spice and water were manually stirred and mixed.

After further being mixed with vinegar (7.5%), blended oil (63%)(rape oil: corn oil=70:30) and phytosterol (10%) having three different ratios of the ester type and the free-type phytosterol, the resulting mixture was put into a hobart mixer, mixed to be emulsified to a homogenized state. It was further emulsified by means of the colloid mill emulsifier to prepare O/W type emulsion of the present invention 3, the present invention 4 and comparative example 2, respectively.

The above composition were subjected to the same shaking test as in Example 1 and observed the occurrence of the separation of oil. The meaning of the symbols and figures in the columns of "Free-type phytosterol (in oil phase)" and "Ester-type phytosterol (in oil phase)", and "Storage stability" are the same as in Example 1.

TABLE 2

|  | Comparative example 2 | Present invention 3 | Present invention 4 |
|---|---|---|---|
| Rape oil | 44 | 44 | 44 |
| Corn oil | 19 | 19 | 19 |
| Phytosterol | 10 | 10 | 10 |
| Egg | 9 | 9 | 9 |
| Vinegar | 8 | 8 | 8 |
| Starch syrup, Salt, Seasoning, Lemon juice, Spice and Water | 10 | 10 | 10 |
| Total | 100 | 100 | 100 |
| Ester-type phytosterol (in oil phase) | 13.16 | 13.55 | 13.85 |
| Free-type phytosterol (in oil phase) | 1.03 | 0.64 | 0.34 |
| Esterification degree | 88.7 | 92.8 | 96.1 |
| Storage stability | X | ○ | ⊚ |

EXAMPLE 3

The O/W type emulsion was prepared by using the same apparatuses as in Example 1. Thus, Egg (10%), and others (7%) including sugar, salt, seasoning, lemon juice, spice and water were manually stirred and mixed. After further being mixed with vinegar (3%), soybean oil (52%) and phytosterol (28%) having three different ratios of the ester type and the free-type phytosterol, the resulting mixture was put into a hobart mixer, mixed to be emulsified to a homogenized state. It was further emulsified by means of the colloid mill emulsifier to prepare O/W type emulsion of the present invention 5, the present invention 6 and comparative example 3, respectively.

The above composition were subjected to the same shaking test as in Example 1 and observed the occurrence of the separation of oil. The meaning of the symbols and figures in the columns of "Free-type phytosterol (in oil phase)" and "Ester-type phytosterol (in oil phase)", and "Storage stability" are the same as in Example 1.

TABLE 3

|  | Comparative example 3 | Present invention 5 | Present invention 6 |
|---|---|---|---|
| Soybean oil | 52 | 52 | 52 |
| Phytosterol | 28 | 28 | 28 |
| Egg | 10 | 10 | 10 |
| Vinegar | 3 | 3 | 3 |
| Sugar, Salt, Lemon juice, Spice and Water | 7 | 7 | 7 |
| Total | 100 | 100 | 100 |
| Ester-type phytosterol (in oil phase) | 32.52 | 33.61 | 34.38 |
| Free-type phytosterol (in oil phase) | 2.31 | 0.98 | 0.45 |
| Esterification degree | 89.6 | 94.4 | 97.9 |
| Storage stability | X | ○ | ⊚ |

INDUSTRIAL APPLICABILITY

The present O/W type emulsion, which is characterized by having oil phase containing a low content of the free-type phytosterol, has excellent storage stability without causing a partial separation of oil during not only use but also distribution.

What is claimed is:

1. An oil in water emulsion, comprising:
   52-63% of at least one oil selected from the group consisting of rape oil, corn oil and soybean oil,
   10-28% of phytosterol,
   8-10% of egg,
   3-8% of vinegar,
   7-12.5%, in total, of additional ingredients, wherein the additional ingredients comprise water,
   wherein
   the oil phase of the emulsion contains 13.55-34.38% of phytosterol ester,
   the oil phase of the emulsion contains 0.34-0.98% of free phytosterol, and
   wherein the esterification degree of the phytosterol is higher than 90.

2. The oil in water emulsion of claim 1, wherein the oil is rape oil.

3. The oil in water emulsion of claim 1, wherein the oil is corn oil.

4. The oil in water emulsion of claim 1, wherein the oil is soybean oil.

5. The oil in water emulsion of claim 1, wherein the oil is rape oil and corn oil.

6. The oil in water emulsion of claim 1, comprising 52-57% of the oil.

7. The oil in water emulsion of claim 1, comprising 57-63% of the oil.

8. The oil in water emulsion of claim 1, comprising 10-15% of the phytosterol.

9. The oil in water emulsion of claim 1, comprising 15-28% of the phytosterol.

10. The oil in water emulsion of claim 1, comprising 8-9% of the egg.

11. The oil in water emulsion of claim 1, comprising 9-10% of the egg.

12. The oil in water emulsion of claim 1, comprising 3-7.5% of the vinegar.

13. The oil in water emulsion of claim 1, comprising 7.5-8% of the vinegar.

14. The oil in water emulsion of claim 1, comprising 13.55-20.28% of the phytosterol ester in oil phase.

15. The oil in water emulsion of claim 1, comprising 20.28-34.38% of the phytosterol ester in the oil phase.

16. The oil in water emulsion of claim 1, comprising 0.34-0.45% of the free phytosterol in the oil phase.

17. The oil in water emulsion of claim 1, comprising 0.45-0.64% of the free phytosterol in the oil phase.

18. The oil in water emulsion of claim 1, comprising 0.64-0.98% of the free phytosterol in the oil phase.

19. The oil in water emulsion of claim 1, wherein the esterification degree of the phytosterol is higher than 95.

20. The oil in water emulsion of claim 1, wherein the esterification degree of the phytosterol is 92.8-97.9.

21. The oil in water emulsion of claim 1, wherein the additional ingredients further comprise starch syrup, salt, spice and lemon juice.

* * * * *